United States Patent [19]

Hager

[11] Patent Number: 4,706,649

[45] Date of Patent: Nov. 17, 1987

[54] SELECTIVELY SWITCHED SHADING FOR DAYLIGHTING AND THE LIKE

[76] Inventor: I. Vincent Hager, c/o East Coast Developments, Ltd., P.O. Box 5845, Hilton Head Island, S.C. 29928

[21] Appl. No.: 776,606

[22] Filed: Sep. 16, 1985

[51] Int. Cl.$^4$ .............................................. F24J 3/02
[52] U.S. Cl. .................................... 126/419; 126/429; 350/264
[58] Field of Search ............... 126/428, 429, 430, 431, 126/438, 439, 419; 350/258, 264, 260, 262, 265

[56] References Cited

U.S. PATENT DOCUMENTS

| | | | |
|---|---|---|---|
| 1,747,928 | 2/1930 | Chesney | 350/264 |
| 3,832,992 | 9/1974 | Trombe et al. | 126/429 |
| 4,112,918 | 9/1978 | Palkes | 126/270 |
| 4,220,137 | 9/1980 | Tesch et al. | 126/439 X |
| 4,228,787 | 10/1980 | Steinemann | 126/429 X |
| 4,280,480 | 7/1981 | Raposo | 126/429 |
| 4,382,436 | 5/1983 | Hager | 126/429 |
| 4,495,937 | 1/1985 | Fisher | 126/430 |
| 4,512,332 | 4/1985 | Lansing | 126/419 X |
| 4,552,205 | 11/1985 | Saunders | 126/429 X |

FOREIGN PATENT DOCUMENTS

| | | | |
|---|---|---|---|
| 1001809 | 2/1952 | France | 350/264 |
| 0031735 | 2/1982 | Japan | 126/429 |
| 0060149 | 4/1982 | Japan | 126/429 |
| 0062454 | 4/1983 | Japan | 126/439 |
| 452807 | 8/1936 | United Kingdom | 350/264 |

*Primary Examiner*—Margaret A. Focarino
*Attorney, Agent, or Firm*—Cushman, Darby & Cushman

[57] ABSTRACT

A unitary structure is provided comprises a frame, including perimeter portions, transparent panels, a pair of spaced rollers rotatable about parallel axes, and a sheet rolled up on the rollers. The sheet has separate and distinct portions which have varying light transmission properties for affecting the amount and/or wave length of natural light that passes through the sheet. Each sheet separate and distinct portion has the approximate height and width of the chamber defined by perimeter portions of the frame. Synchronous motors for rotating the rollers are disposed in cavities formed in the frame perimeter portions, and photoelectric control components are also provided. Vents are provided in the frame adjacent the top and bottom for selectively allowing or preventing the passage of air into the chamber.

2 Claims, 4 Drawing Figures

SELECTIVELY SWITCHED SHADING FOR DAYLIGHTING AND THE LIKE

BACKGROUND AND SUMMARY OF THE INVENTION

In many situations it is desirable to be able to control the amount of light passing into association with components of a building. For instance passive solar collection systems, such as trombe walls, can benefit from having the amount and/or wave length of light passing thereto controlled, as well as the amount of heat leaving the trombe wall and the light being reflected before impacting the trombe wall. Also it is desirable to be able to control the venting of air past the trombe wall.

Another situation in which light control is desirable is in a system associated with a building to supply sunlight to interior portions of the building located significant distances away from exterior windows, and daylight also is desirably controlled at the exterior walls.

According to the present invention a system is provided which has a number of advantages, including excellent versatility and heat and light control, in a wide variety of applications associated with buildings.

According to one aspect of the present invention, in combination with a building, a structure is provided comprising: a trombe wall; means for controlling the passage of light to the trombe wall, said means comprising: a pair of spaced rollers disposed exteriorly of the wall and rotatable about axes substantially parallel to each other; a sheet of material rolled up on the rollers, the sheet having separate and distinct portions thereof each of which has substantially the same length and height as a portion of the trombe wall, and the sheet separate and distinct portions having varying light transmission properties for affecting the amount and/or wave length of natural light passing through the sheet into contact with the trombe wall; and means for effecting rotation of the rollers to control which of the separate and distinct portions of the sheet is in operative association with the trombe wall at any one time.

According to another aspect of the invention there is provided a selectively switched shading structure comprising a unitary structure including: frame means, including perimeter frame portions defining a chamber therebetween, and transparent panel means defining one side of the structure (with vents at the top and bottom) and extending between the perimeter frame means; a pair of spaced rollers rotatable about generally parallel axes of rotation and mounted by the frame means; a sheet rolled up on the rollers and having distinct portions of varying properties, each of the distinct portions having approximately the same width and height as the chamber defined by the frame means, and the different and distinct portions of the sheet having varying light transmission properties for affecting the amount and/or wave length of light which passes therethrough after first passing through the transparent panel means; and means for effecting rotation of the rollers to control which of the separate portions of the sheet is disposed in operative association with the transparent panel means at any one time.

According to yet another aspect of the invention there is provided in combination with the room of a building, a system for supplying daylight to portions in the interior of the building located a significant distance from exterior windows, the system comprising: A first component having a generally planar configuration and disposed at an angle between a roof portion and a wall portion of the building on a side thereof which receives sunlight. A parabolic reflector operatively mounted behind the first component for receipt and reflecting of light having a low trajectory that passes through the first component. Flat light reflecting means disposed in operative association with the parabolic reflector and the first component to reflect light from the parabolic reflector, and high trajectory light passing through the first component, into the interior space of the building. And, further reflective surfaces disposed within the building and mounted with respect to the flat reflecting means for dispersing and diffusing light reflected by the flat reflecting means into interior portions of the building remote from exterior windows. Similar arrangements may be made for roof skylights, too.

It is the primary object of the present invention to provide simple and effective light and/or heat control for a building. This and other objects of the invention will become clear from an inspection of the detailed description of the invention, and from the appended claims.

DETAILED DESCRIPTION

Figure 1:
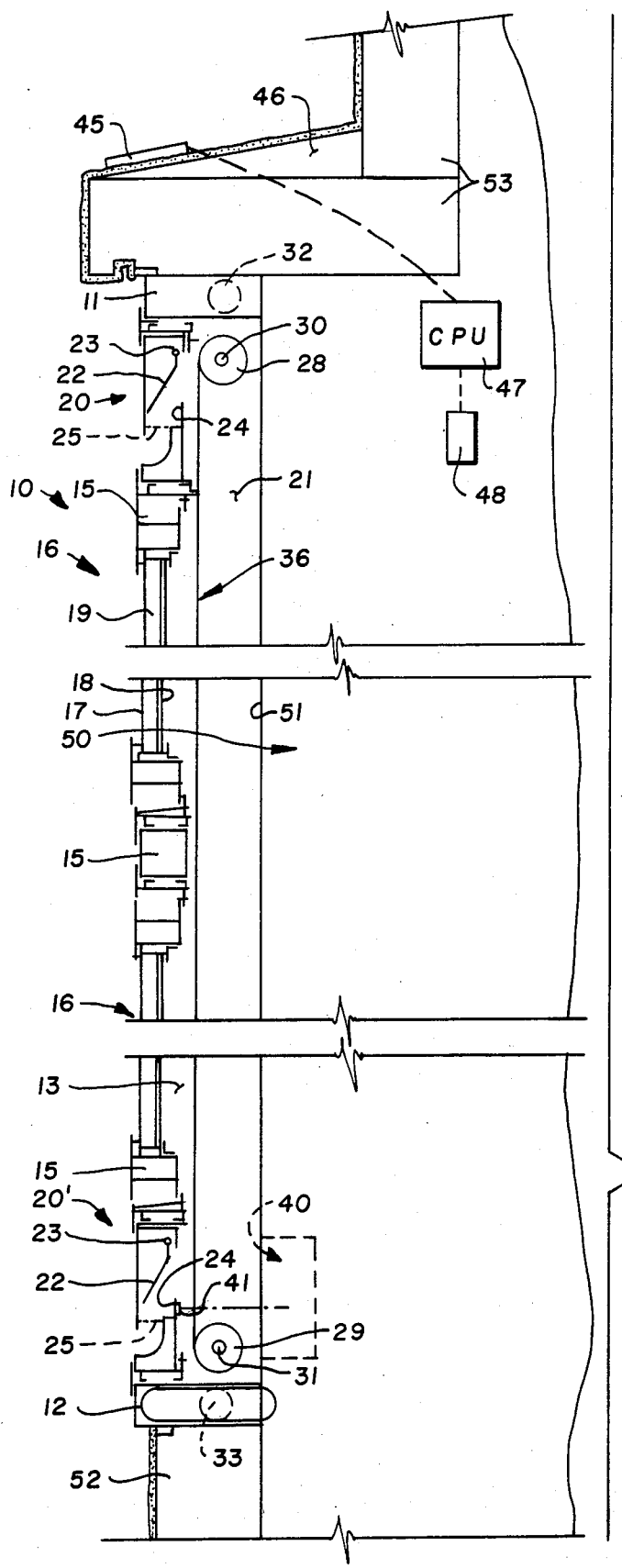
FIG. 1 is a side schematic crosssectional view of an exemplary combination according to the invention of a trombe wall and selectively switched shading unit.
Figure 3:
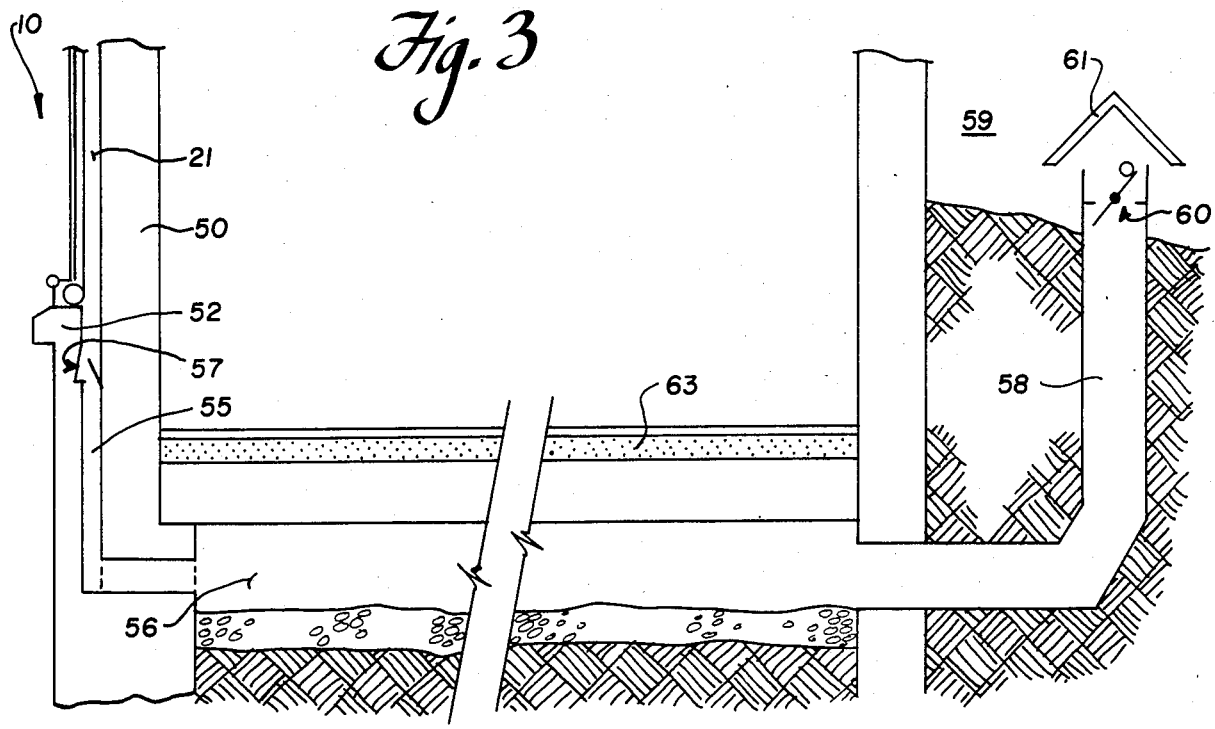
FIG. 3 is a schematic side crosssectional view of the interconnection of the trombe wall of FIG. 1 with various other building components.
Figure 4:
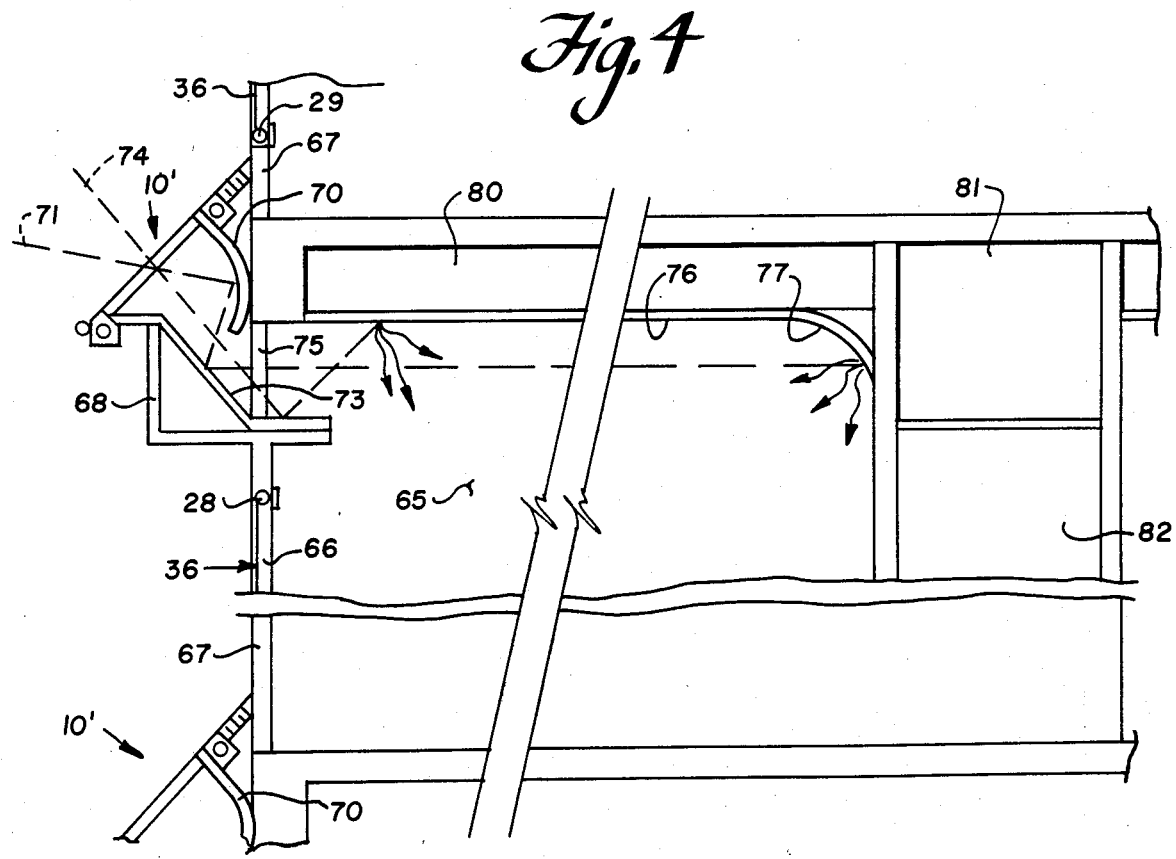
FIG. 4 is a schematic side crosssectional view of a selectively switched shading unit such as shown in FIG. 1 in association with other components for supplying natural sunlight into interior portions of the building located away from exterior windows.

A selectively switched shading structure according to the invention comprises unitary structure 10 illustrated in detail in FIG. 1 and schematically in FIGS. 3 and 4. The unitary structure comprises frame means including perimeter frame portions 11, 12 providing the top and bottom of the structure 10, and similar side perimeter portions, one of which is shown by reference numeral 13 in FIG. 1. The perimeter frame portions 11-13 preferably are composed of square aluminum tubing, such as 2"×5" aluminum tubing. The frame means also include interior frame components 15 and the like, which may comprise 2"×2" aluminum square tubes or blocks. Transparent panel means 16, such as operable casement windows 17, 18 of glass and separated by an insulated space 19 (e.g. one inch), are mounted by the frame components 11-13, 15. The transparent panel means 16 define one side of the structure and operably span the distance between the perimeter frame means 11, 12, 13, etc. (along with the interior frame components of the frame means, such as components 15). Additionally, vent means, illustrated schematically by upper vent 20 and lower vent 20' in FIG. 1, are provided for venting the chamber 21 defined by the frame components 11 through 13, 15, etc. The vent means 20, 20' may comprise any suitable movable vents, such as the vent sheets 22 which are pivotally mounted at points 23 for pivotal movement into, and out of, operative association with a stationary sealing portion 24 of a frame component 15, the sheets 22 being pivotal about the pivot points 23 by any suitable powering means. Preferably screens 25 are disposed in operative association with the vents 20 to prevent passage of insects, or foreign matter, into the chamber 21 past the vent blades 22 when they are spaced from the sealing components 24.

The unitary structure 10 also comprises a pair of spaced rollers 28, 29 which are mounted for rotation about axes which are generally parallel to each other. Preferably the roller 28 is rotatable about horizontal axis 30, while the roller 29 is rotatable about the horizontal axis 31 which is located below the axis 30. The rollers 28, 29 are rotated by means for effecting rotation of the rollers, such means preferably comprising synchronous motors 32, 33 mounted in the upper and lower frame perimeter portions 11, 12, respectively, and operatively connected through any suitable mechanical connection (such as chain and sprockets, gears, belts, and the like) to the rollers 28, 29.

Figure 2:
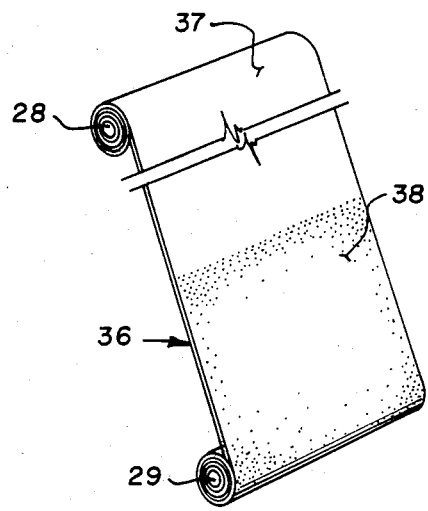
FIG. 2 is a perspective schematic view showing the sheet of the selectively switched shading unit of FIG. 1, in combination with the rollers.

The unitary structure 10 also comprises a sheet 36 (see FIGS. 1 and 2 in particular) rolled up on the rollers 28, 29 and having distinct portions (such as the portions 37, 38 illustrated in FIG. 2) of varying properties. Each of the distinct portions, such as the portions 37, 38, have approximately the same width and height as the chamber 21 defined by the frame components 11 through 13, etc., and the portions (such as portions 37, 38) have varying light transmission properties for affecting the amount and/or wave length of light which passes therethrough after first passing through the transparent panel means 16.

Any number of distinct portions 37, 38 may be provided so that the control of the amount and/or wave length of light passing through the unitary structure 10 can be precisely controlled; for instance 10 or 12 different portions 37, 38 may be provided. In fact the sheet 36 may have portions thereof which are opaque, i.e. do not allow the passage of any light therethrough, or may have portions that are completely transparent (with all ranges in between), and/or may also include portions for controlling the reflection of light from the sheet 36 back through the transparent panels 16, and/or the passage of heat through the sheet 36 from either side of the sheet 36. For instance several lengths (portions) of the sheet 36 may comprise three mil 300 D DuPont film connected with pressure tape to each other, and others of the portions may comprise opaque film metallized to different extents, such as metallized so that less than one ohm/per square inch of transmission is provided thereby.

The sheet 36 divides the chamber 21 into two distinct vertically disposed sections.

Control means may also be provided for controlling the synchronous motors 32, 33 mounted within the hollow cavities of the frame perimeter portions 11, 12 so that the motors 32, 33 control which of the portions (e.g. portions 37, 38) of the sheet 36 are in operative association with the panels 16. For instance the control means may comprise a photocell arrangement 40 operatively mounted on the opposite side of the sheet 36 from the transparent panel means 16, and a mirror 41 mounted on the frame means 15, such as adjacent the vent means 20', in operative association with the photocell 40 so that light passing through the sheet 36 reflects off the mirror 41 to the photocell. Control may also be provided by data gathering panels (i.e. panels sensitive to the ambient light) 45 mounted on a collecting portion 46 of a building with which the unitary structure 10 is associated, and a central processing unit 47, the CPU 47 connected to a suitable electronic controller 48 for controlling the motors 32, 33 and for controlling the means (not shown) for effecting opening or closing of the vents 20, 20'.

Thus, as is apparent from the above recited disposition of elements, one manner in which the control means may operate when, for example, two panels are provided on this sheet 36, one being opague and one being transparent, is as follows:

During the night the opaque panel 38 of sheet 36 is in operative association with the panels 16. When the sun first comes up in the morning, the light causes the light sensitive panels 45 to activate the central processing unit 47. The CPU 47 starts motors 32, 33 so as to rotate rollers 28 and 29 which in turn cause the opaque panel 38 to move downwardly so as to be replaced by transparent panel 37. The transparent panel 37 moves down to a point where a light beam emitted from photocell 40 is able to pass through the transparent panel 37 to the mirror 41 and back to the photocell 40. At this point the photocell 40 will signal the central processing unit 47 to stop the operation of the motors 32, 33. Thus, during the day the transparent panel 37 will be in operative association with the panels 16. In the evening, as the sun goes down, the reverse will happen. The light sensitive panel 45 will cease to receive light and the process will reverse so that the transparent panel 37 is replaced by the opaque panel 38 until morning when light will again cause the light sensitive panel 45 to go into operation. The operation just described could be used, for example, to let light rays in during the day to hit the trombe wall and heat up the building and then in the evening an opaque panel 38 with a metal tie surface would replace the transparent panel 37 to keep heat from radiating out of the building.

In FIG. 1, the unitary structure 10 is shown in operative association with a trombe wall 50. The trombe wall 50 can be of any suitable conventional construction, such as one having a "sun sponge" solar foil selective coating 51 glued to the exterior face thereof. An insulating bottom structure 52, and insulating top structure 53, are provided in association with the tops and bottoms of the unitary structure 10 and the trombe wall 50.

The building with which the trombe wall 50 and unitary structure 10 are associated include—as shown in FIG. 3—means defining a passage 55 between the chamber 21 and a cold sink area 56 associated with the building, with a vent 57 disposed in the passage 55 for selectively allowing or preventing communication between the chamber 21 and the cold sink area 56. One or more earth cooling tubes 58 also are provided extending between the cold sink area 56 and the ambient atmosphere 59, with vent means 60 operatively disposed in the earth cooling tubes 58 adjacent the rain coverings 61 thereof for selectively allowing or preventing communication between the cold sink area 56 and the ambient atmosphere 59 through the earth cooling tubes 58. The tubes are of highly heat conductive material (e.g. metal) and easily transfer heat into the ground.

The trombe wall 50 and unitary structure 10 are used for both heating and cooling. In the cooling mode (e.g. during the summer), the vent 20 at the top of the chamber 21 is opened, as is the vent 20', to allow circulation of air through the chamber 21. In this mode, also, the vent 20' may be closed (with 20 open) and the vents 57 and 60 are opened. The coolness of the ground cools heat sink area 56, below floor 63', and tubes 58, and air thus passes through vent 60, through cooling tubes 58, through cold sink 56, and then through vent 57 to chamber 21. In the heating (winter) mode, the vents 20, 20' are closed, the vents 57 and 60 are closed, too.

In the FIG. 4 embodiment of the invention, a unitary structure 10 according to the invention is shown in combination with the room 65 of a building and a system for supplying daylight to portions of the interior of the building, including the room 65, located a significant distance from exterior windows 66, which may comprise units 10. The system comprises a first component, which preferably is a unitary structure 10' like structure 10 (but smaller), but alternatively may include merely fixed transparent panels with or without vents, having a generally planar configuration and disposed at an angle between an upper story portion 67 and a wall portion 68 of the building on a side thereof which receives sunlight.

The system further comprises a parabolic reflector 70 operatively mounted behind the first component (10) for receipt and reflecting of light having a low trajectory passes through the first component (10), and is illustrated schematically by light beam 71 in FIG. 4.

The system further comprises a flat light reflecting means 73 disposed in operative association with the parabolic reflector 70 and the first component (10') to reflect light from the parabolic reflector, and high trajectory light (illustrated schematically by light beam 74 in FIG. 4) passing through the first component (10'), into the interior space of the building. Further reflective surfaces, as reflective portions of the ceiling 76 of the room 65, and the wall-ceiling interface 77, are disposed within the building room 65 and mounted with respect to the flat reflectors 73 for dispersing and diffusing light reflected by the flat reflecting means 73 into interior portions of the building, including room 65, remote the exterior windows 66. A second fixed transparent panel 75 may optionally be provided to conserve heat. Of course other operable components of the building illustrated in FIG. 4 may comprise the duct space 80, communication space 81, corridor 82, and the like, and the components may be stacked one upon each other in a conventional office building so that the upper story portion 67 forms the base of another upper floor of the building, and the "wall portion 68" forms the top of a lower floor of the building including the room 65. Heat buildup also is controllable utilizing this aspect of the invention.

Utilizing structures 10 as "normal" exterior windows 66, they control the amount of daylight entering a building adjacent the exterior walls thereof, the amount of direct solar gain, and/or the amount of heat entering or leaving through the windows. When so used, the structures 10 function much like the windows in U.S. Pat. No. 4,382,436, the disclosure of which is hereby incorporated by reference herein.

It will thus be seen that according to the present invention a versatile, simple, and effective light and/or heat control system for a building is provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and apparatus.

What is claimed is:

1. In combination with a building, a system for supplying daylight to an interior portion of said building including rooms located at a significant distance from exterior windows of said building, said system comprising:

a first component having a generally planar configuration and disposed at an angle between an upper story portion and a wall portion of said building on a side thereof which receives sunlight;

a parabolic reflector operatively mounted behind said first component relative to the origin of the sunlight for receiving and reflecting sunlight having a low trajectory which passes through said first component;

flat light reflecting means disposed in operative association with said parabolic reflector and said first component to reflect light from said parabolic reflector, and sunlight having a high trajectory which passes through said first component, into an interior portion of said building; and further reflective surfaces disposed within said building and mounted with respect to said flat reflecting means for dispersing and diffusing light reflected by said flat reflecting means into interior portions of said building, including at least one room, remote from exterior windows;

wherein said first component is a unitary structure comprising: frame means, including perimeter frame portions defining a chamber therebetween, and transparent panel means defining one side of said chamber and extending between said perimeter frame means; a pair of spaced rollers rotatable about generally parallel axes of rotation and mounted to said frame means; a sheet of material coupled at each end thereof to one of said rollers, respectively, and extending therebetween and having at least two distinct portions, each of said distinct portions having substantially the same width and height as said chamber and having different light transmission properties for affecting at least one of the amount and the wave length of light which passes therethrough after first passing through said transparent panel means; and means for effecting rotation of said rollers to control which of said distinct portions of said sheet is disposed in operative association with said transparent panel means at any one time.

2. Apparatus as recited in claim 1, wherein said perimeter portions of said frame means define hollow cavities, and wherein said means for effecting rotation of said rollers comprises first and second synchronous motors disposed in said cavities and operatively coupled to said rollers.

* * * * *